US006314565B1

(12) United States Patent
Kenner et al.

(10) Patent No.: US 6,314,565 B1
(45) Date of Patent: *Nov. 6, 2001

(54) SYSTEM AND METHOD FOR AUTOMATED IDENTIFICATION, RETRIEVAL, AND INSTALLATION OF MULTIMEDIA SOFTWARE COMPONENTS

(75) Inventors: Brian Kenner, Encinitas; Kenneth W. Colby, San Diego; Lonnie J. Brownell, Encinitas, all of CA (US)

(73) Assignee: Intervu, Inc., San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,355

(22) Filed: Apr. 30, 1998

Related U.S. Application Data

(60) Provisional application No. 60/047,113, filed on May 19, 1997.

(51) Int. Cl.[7] ................................................... G06F 9/445
(52) U.S. Cl. ................................................................ 717/11
(58) Field of Search ........................... 395/712; 709/221; 717/11, 1

(56) References Cited

U.S. PATENT DOCUMENTS

| 5,539,908 | * | 7/1996 | Chen et al. | 717/11 |
|---|---|---|---|---|
| 5,694,546 | * | 12/1997 | Reisman | 705/26 |
| 5,790,796 | * | 8/1998 | Sadowsky | 717/11 |
| 5,845,077 | * | 12/1998 | Fawcett | 709/221 |
| 5,909,581 | * | 6/1999 | Park | 717/11 |
| 5,913,038 | * | 6/1999 | Griffiths | 717/11 |
| 5,918,002 | * | 6/1999 | Klemets et al. | 714/18 |
| 5,963,916 | * | 10/1999 | Kaplan | 705/26 |
| 5,974,572 | * | 10/1999 | Weinberg et al. | 714/47 |
| 6,006,241 | * | 12/1999 | Purnaveja et al. | 707/512 |
| 6,009,274 | * | 12/1999 | Fletcher et al. | 717/11 |
| 6,074,434 | * | 6/2000 | Cole et al. | 717/11 |

OTHER PUBLICATIONS

Ladd et al., "Platinum Edition: Using HTML 3.2, Java 1.1 and CGI". Que Corporation, Indianapolis, IN, Chapters 25 and 41, Nov. 1996.*
Internet Content Report; "Search Engines, Knowbots & Agents: "Digital Oil Change" uses Internet to Automatically Update Software Products". Communications Industry Researchers, Inc., Gale Group, Nov. 1996.*
Business Wire; "CyberMedia Oil Change software: How it works". Gale Group, Business Wire, p05140278, May 1996.*
PR Newswire; "Position Briefing: Oil Change Can Lower both user and vendor tech support costs". Gale Group, PR Newswire Association, Inc., p514NYTU042, May 1996.*

(List continued on next page.)

Primary Examiner—Mark R. Powell
Assistant Examiner—Kelvin Booker
(74) Attorney, Agent, or Firm—Darby & Darby

(57) ABSTRACT

A method for updating software components on a user terminal connected to a network provides for the automatic identification, retrieval, and installation of a selection of software components based on information contained in a script file and furnished by a user. The script file maintains information on current version numbers for the software components, and the method checks that information against stored configuration information to determine whether any components need to be updated. If so, the method simulates a manual transaction between the user terminal and a server storing the desired software component by following instructions set forth in the script file, which is updated as necessary, and sending appropriate user information to the server. The software component acquired thereby is then installed.

24 Claims, 3 Drawing Sheets

OTHER PUBLICATIONS

Robinson et al.; "ActiveX Magic: An ActiveX Control and DCOM Sample Using ATL". Microsoft Website[online]. Accessed on Nov. 4, 1999. Retrieved from the Internet:Http://www.microsoft.com, May 1997.*

Sankar, K.; "Internet Explorer Plug-in and ActiveX Companion". IT Library[online]. Que Development Group. Chapter 1, Jan. 1997.*

Chen, W.; "ActiveX Programming Unleashed". IT Library [online]. Sams Net. Chapter 1, Sep. 1996.*

* cited by examiner

SYSTEM AND METHOD FOR AUTOMATED IDENTIFICATION, RETRIEVAL, AND INSTALLATION OF MULTIMEDIA SOFTWARE COMPONENTS

This application claims the benefit of U.S. Provisional Application No. 60/047,113, filed May 19, 1997, abandoned.

The invention relates to a system and method for automating the retrieval and installation of software components, and more particularly, to a software tool which allows a user to automatically download audio/video player software from distributed Internet servers, and to identify and update multimedia software components, thereby providing access to multiple types of audio/video content.

BACKGROUND OF THE INVENTION

The Internet is a loose network of connected computers spread throughout the world. A message can be sent from any computer on the Internet to any other by specifying a destination address and passing the message from computer to computer via a series of "hops." Each computer, or "node," on the Internet has a unique Internet address. When an intermediate computer receives a message in transit, the computer checks the intended destination of the message and passes it along accordingly.

The Internet is growing, in terms of both size and sophistication, at a rapid rate. In the past, most users of the Internet were academic, research, or institutional users; the Internet was primarily used at that time to transmit and receive electronic mail and network news and to allow transfer of computer files.

However, since the introduction of the World Wide Web (also known as the "Web" or the "WWW") several years ago, the Internet has begun to host increasing amounts of other types of data of general interest, namely representations of images, articles, etc.

The Web presents a graphical user interface to the Internet. "Web pages," often consisting primarily of text and graphical material, are stored on numerous computers, known as "Web servers," throughout the Internet. These Web pages are generally described, in terms of layout and content, by way of a language known as "HTML" (HyperText Markup Language). Any particular computer linked to the Internet can store one or more Web pages, i.e. computer files in HTML format, for access by users. The Web pages are accessed via a protocol known as "HTTP" (HyperText Transport Protocol). The HTTP protocol specifies the language by which request are made to transfer data between a server computer and a client computer.

A software program known as a "browser" can be used to access and view Web pages across the Internet by specifying the location (i.e. Internet address) of the desired Web page, or more commonly, by "hotlinking" to Web pages. Two of the most popular browsers are Microsoft Internet Explorer® and Netscape Navigator®. The desired Web page is specified by a uniform resource locator ("URL") , which Usually indicates the precise location of the HTML file in the format "http://internet.address/directory/filename.html".

Hotlinking is accomplished as follows. The user first accesses a Web page having a known address, often on the computer located at the user's ISP (Internet Service Provider). The ISP is the organization providing Internet connectivity to the user. The accessed Web page can contain, in addition to textual and visual data specified in HTML format, "links," or embedded information (in the form of URLs) pointing to the Internet addresses of other Web pages, often on other computers throughout the Internet. The user, by selecting a link (often by pointing and clicking with a mouse), can then access other Web pages, which can in turn contain further data and/or additional links.

The selection of a link causes the browser to issue a request to the server computer specified by the URL, typically via the so-called "GET method" described by the HTTP specification, version 1.0. A message sent via the GET method requests the server computer to transmit a specified item of data, typically (at first) a Web page in HTML format. The GET request is received and processed by the remote server computer, which then transmits the requested information from wherever in the world it may be located, across the Internet, to the user. The Web page received by the user typically will contain references to embedded images and other non-textual data, which in turn can be processed by the browser, resulting in additional GET requests to retrieve the other data. It should be noted that a GET method request need not directly specify the identity of the requested file; it can contain a code that is processed and decoded by the server computer to identify the requested file.

Another type of request authorized by HTTP 1.0 is made via the "POST method." A message sent via the POST method requests the server to accept a quantity of information and store it in a file or transfer it to an application running on the server computer. The POST method typically is used to send information from the user to the server computer for processing by the server, although the GET method can be used to accomplish this task, as well, via a code-containing URL.

In recent times, the Web has begun to host highly sophisticated types of multimedia content, such as audio and video data. Various extensions to HTML, such as Netscape's EMBED tag, allow references to other data to be embedded into Web pages. External programs, or "plug-ins," to the browsers can be automatically invoked to handle the data as it is received from the remote Web server computer.

One problem presented by the proliferation of audio, video, and other types of non-textual data on the Internet relates to the distribution and storage of audio/video data and multimedia software programs for retrieving and playing back audio/video data. Before a video can be transmitted over a computer network, the video must be digitized by encoding the video's analog signal to "1s" and "0s." In order to reduce the bandwidth required to transmit the digitized video, the video data stream is compressed. Video compression is a process by which redundant data is eliminated from the video data stream so that the overall size of the data stream is reduced. There are many different compression formats which are used to reduce video data streams, for example MPEG, motion JPEG, H.261, Indeo, Cinepak, AVI, QuickTime, TrueMotion, Wavelet, and RealVideo, among others.

Videos which are transmitted and received in a compressed format must be decompressed before they can be viewed- Decompression of a video is done by a video player coder/decoder, or "codec," located at a user's multimedia terminal, usually as a plug-in or companion to the browser. Generally speaking, a single codec can only recognize and decompress a single compression format or family of related formats.

When the video clip requested by a user is stored for transmission in a format which can be decompressed by one of the codecs installed at the user terminal, delivery of the video clip to the user can proceed smoothly. This is typically the situation where a subscription service provides video delivery over a confined network. The service will provide the subscribing user with a preferred codec and then store video clips in the same compression format recognized by that codec.

However, when the service begins to make video clips available over the Internet, it is more likely that the video clips will be requested by a non-subscribing user whose multimedia terminal does not have a codec that recognizes the compression format in which the video clips are stored. If this is the case, the user's video request must be redirected to a video clip stored in a compression format recognized by the user's codec, or the user must somehow acquire and install a codec program which is capable of decompressing the desired video clip. In many cases, the video request cannot be redirected to a video clip with a recognizable format, because video clips generally are not stored in a variety of compression formats, due to their large size and the limited storage capacity of the server. In this situation, downloading a new codec is the only alternative.

A codec program is frequently accessible via a link embedded in the web page referencing the requested video. Thus, it is usually possible to select and download the codec program via the Internet. When a user requests a video clip referenced on a web page, the browser usually prompts the user to acquire the codec necessary to decompress the format of the requested video. However, in order to acquire the codec, the user is forced to hotlink to a different web page, find the correct codec, transmit certain information to the codec provider, download and install the codec, and then try to find the original Web page with the link to the originally requested video file. Each time the user selects a video in a format not recognized by a codec at the user terminal, this process must be repeated.

Preferably, the process of acquiring and downloading a new codec can be partially or completely automated. This can be done in at least two ways. First, the process can be fully automated by the content provider by acquiring distribution rights to a codec, and then devising an installation script or computer program that is capable of automatically acquiring the codec from the content provider (rather than directly from the codec provider) and then installing the codec. Unfortunately, it can be expensive or difficult to acquire distribution rights in a codec produced by another company, and the creation of an installation script can also be resource-intensive. Second, a script can be created which simply acquires a new codec from the codec provider, with the installation of the codec left to the codec provider (via a script or program usually included with the codec package). However, with the latter alternative, the codec installation process may have an inconsistent "look and feel" because the installation script was created by an independent codec provider, rather than the content provider.

Most video content providers are constantly enhancing the performance characteristics of their video data and as they do, the codecs which recognize those videos are updated to take advantage of the video enhancement features. In order for a user to determine whether or not his or her codec needs to be updated, or whether an upgraded version of the codec has been released, the user must locate the Web page of the codec provider, compare the information on that page with his own system properties, determine whether he has the latest update or version and then proceed with downloading the latest update or version to the user terminal. If the user wants to keep all multimedia software updated, this process must be repeated for each of the codecs stored in memory.

Finally, enriched or enhanced video files are distributed randomly across the Internet at the discretion of the content provider. There is no single source, or user's guide, that advises the user of the location of enhanced video files or the availability of improved multimedia software that can be used to view enhanced video files, nor is there a single source program that enables the user to access all of the data. Web pages embedding references to video files are usually encountered by chance when a user browses the Internet. If a user finds a web page referencing a video file and opens it, he may encounter a link to a content provider or video delivery service that provides access to a list of videos in a particular compression format and a link to a codec that can be used to view the videos carried by that provider. However, these content providers usually do not store videos and codecs in multiple formats, and they do not provide links to differently formatted video content or multimedia software stored at other sites around the Internet.

Thus, a need can be seen for a solution that deals with all of the aforementioned problems in a comprehensive way such that improved access to the best video content is assured and the user's enjoyment of Internet-delivered audio and video is maximized. Accordingly, a solution is provided herein by way of the following described invention.

SUMMARY OF THE INVENTION

A system and a method are provided whereby the identification, acquisition, and installation of multimedia computer software is automated. When a user desires to update the configuration of a user terminal with the latest multimedia software, the software updating tool of the invention determines what components need to be updated, sends the necessary user information to the software component provider's server, receives the software component (which in one embodiment of the invention is typically a multimedia codec), and installs the component.

Accordingly, and more specifically, the software updating tool is used to analyze and update the multimedia software at the user terminal (including, for example, a network testing software tool if one is installed), as well as to download multimedia software from distributed servers on the Internet and install the software to the user terminal.

The multimedia software updating tool downloads a script file from an update service provider coupled to the network. The script file contains a list of multimedia software and upgrades located at various sites on the Internet, a list of servers from which the software can be obtained, and detailed instructions for automating the retrieval of the software. The script file allows the updating tool to adjust to various codecs, changes in the downloading process, and the availability of a single software component or codec from multiple mirror sites.

The software updating tool then analyzes configuration information from the user terminal to determine what multimedia software is stored by the system. The tool then compares a list of the user's multimedia software with the list of software upgrades contained in the script file. Based on this comparison, the updating tool is able to advise the user as to the availability of upgrades which can be used to enhance the multimedia software preexisting on the user terminal, and also of new multimedia software that is not presently installed on the user terminal. The user then has the option to upgrade his existing multimedia software or download new multimedia software. If the user requests new software or software upgrades, the updating tool uses the instructions in the script file, as well as user information that is input by the user only once and then stored at the user terminal, to simulate manual transactions between the user terminal and the servers where the desired upgrades are stored. This prompts the servers to send the appropriate components. Once the user terminal receives the data, the updating tool initiates installation of the software or software upgrades on the user terminal.

The updating tool is able to determine what portions of the upgrades or software programs are required for functionality; it will then selectively install only those attributes, thereby conserving storage space. In cases where the updating tool must close and reopen the browser to permit the installation of software, the tool will reopen the browser and bring the user back to the web page containing the original video request upon completion of the installation process.

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
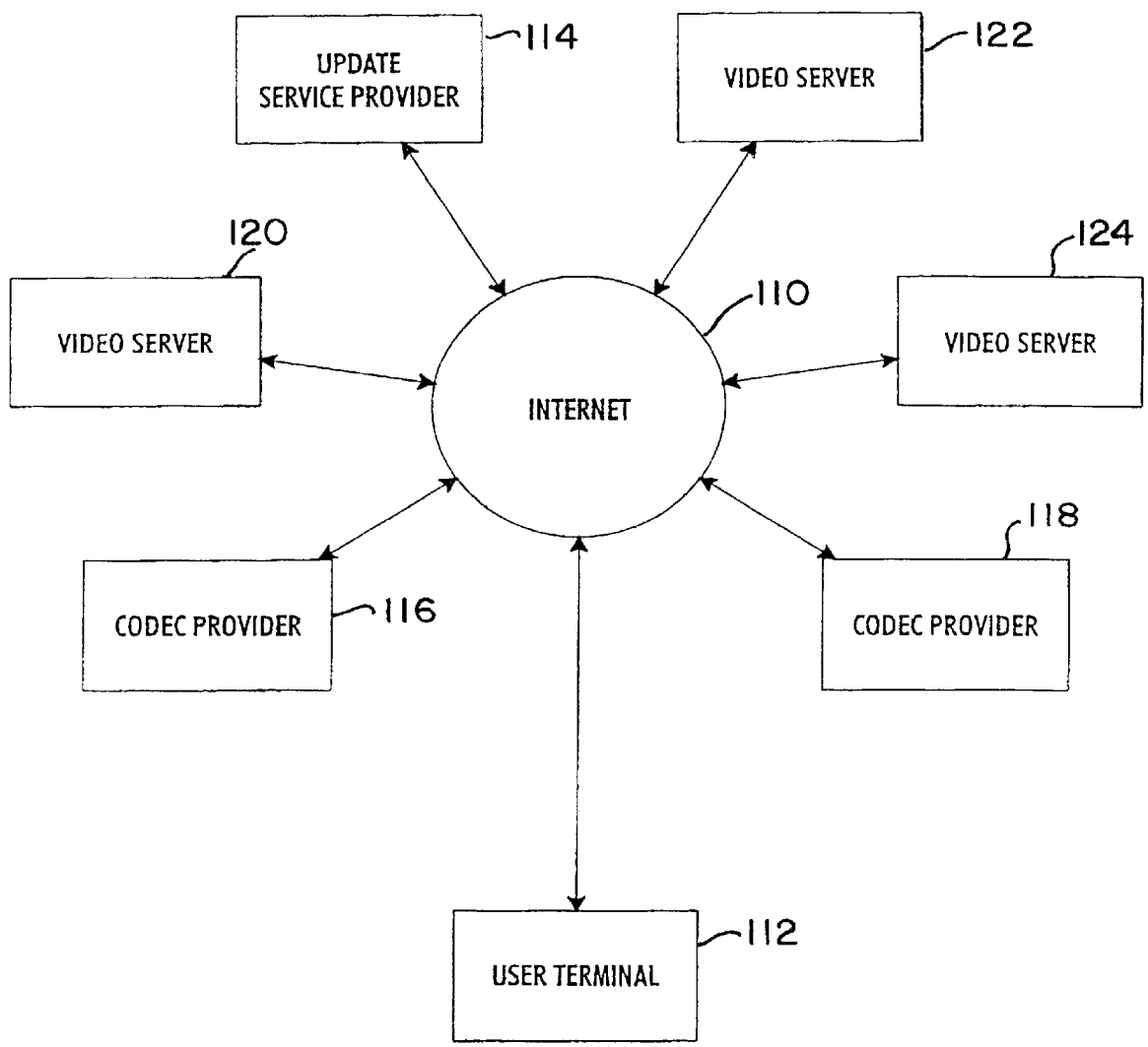
FIG. 1 is a block diagram illustrating the relationship among a user terminal, several video server computers, several codec providers, and the update service provider in a multimedia software component updating system according to the invention.

Referring initially to FIG. 1, the Internet 110, which is intended to be representative of wide-area communications networks in general, is depicted in the center of the figure. The Internet is known to be an interconnected network of a large number of computers. Although Internet-connected computers that are "geographically" near each other can be "electronically" near each other on the Internet, such is not usually the case. However, one computer connected to the Internet can communicate with any other computer connected to the Internet; the message will most likely travel over a path comprising a sequence of links, or "hops," between computers that are directly connected to each other.

A user terminal 112 is shown coupled to the Internet 110. An update service provider 114, two codec providers 116 and 118, and three video servers 120, 122, and 124 are also coupled to the Internet 110. Because all of these computer systems are coupled to and in communication with the Internet 110, communication can be made between any two of the systems, even though there is not necessarily a direct connection between any two of them. In a preferred embodiment of the invention, the multimedia updating function is performed in part by the user terminal 112 exchanging requests and information with the update service provider 114, at least one codec provider 116 or 118, and at least one video server 120, 122, or 124; the specific communications will be discussed in greater detail below.

In general terms, as discussed in the foregoing Background of the Invention, it has been observed that a substantial number of digital video formats are now in existence. These formats are usually incompatible with each other, and are not interchangeable. Each format has its own advantages and disadvantages. For example, Apple Computer's QuickTime and Microsoft's Video for Windows (AVI) schemes are optimized for use with personal computers, and video clips using those formats are relatively easy and fast to create. On the other hand, MPEG-1 (used, for example, for the Video CD and CD-i formats) and MPEG-2 (as used in DVD and direct broadcast satellite applications) provide for high levels of compression, but are slow to compress, and therefore more suited for professional encoding. RealVideo and Vivo formats are also slow to compress, but provide extremely high levels of compression at the expense of image quality, so that video can be transmitted more quickly over relatively slow data connections (such as analog telephone lines).

A single video clip that is available on the Internet is not usually stored in all of these formats. The video clip provider frequently makes a choice of a single compression scheme, for example MPEG-1, and stores all of its video clips in that format. Accordingly, if a user wishes to view one of that provider's videos, he must have the proper software, or "codec," to decode the compressed data. The invention set forth herein facilitates that by providing simplified and automated access to a quantity of video codecs. Outdated codecs can also be updated automatically by the invention.

The updating function is performed, in general, as follows. The user terminal 112 acquires a script file from the update service provider 114. It should be noted that although only one update service provider is illustrated in FIG. 1, the invention is not so limited. When the number of users of the disclosed system becomes large, it is expected that the number of demands for script files will exceed the capacity of a single network server. Accordingly, it is anticipated that a number of update service providers will be coupled to the Internet 110; a single user terminal 112 can select a specific update service provider 114 by any of a number of means, including manual selection, random selection, geographic proximity, or network efficiency (as determined by a separate network testing program).

The script file contains information on a variety of multimedia codecs, including the most recent version numbers, specific capabilities of each codec, network locations from which the codecs can be obtained, browser compatibility information, and instructions on how to automatically acquire and install each codec. This information is used by the system in the manner set forth in the discussion below of FIG. 2.

After the script file is acquired, its codec information is compared to that stored at the user terminal 112. This operation may identify certain codecs that are either not installed on the user terminal 112 or for which new versions have been released. The user is given the opportunity to select which codecs to install, the corresponding software is acquired from the appropriate codec providers 116 and 118, and the software is installed to the user's system.

Figure 2:
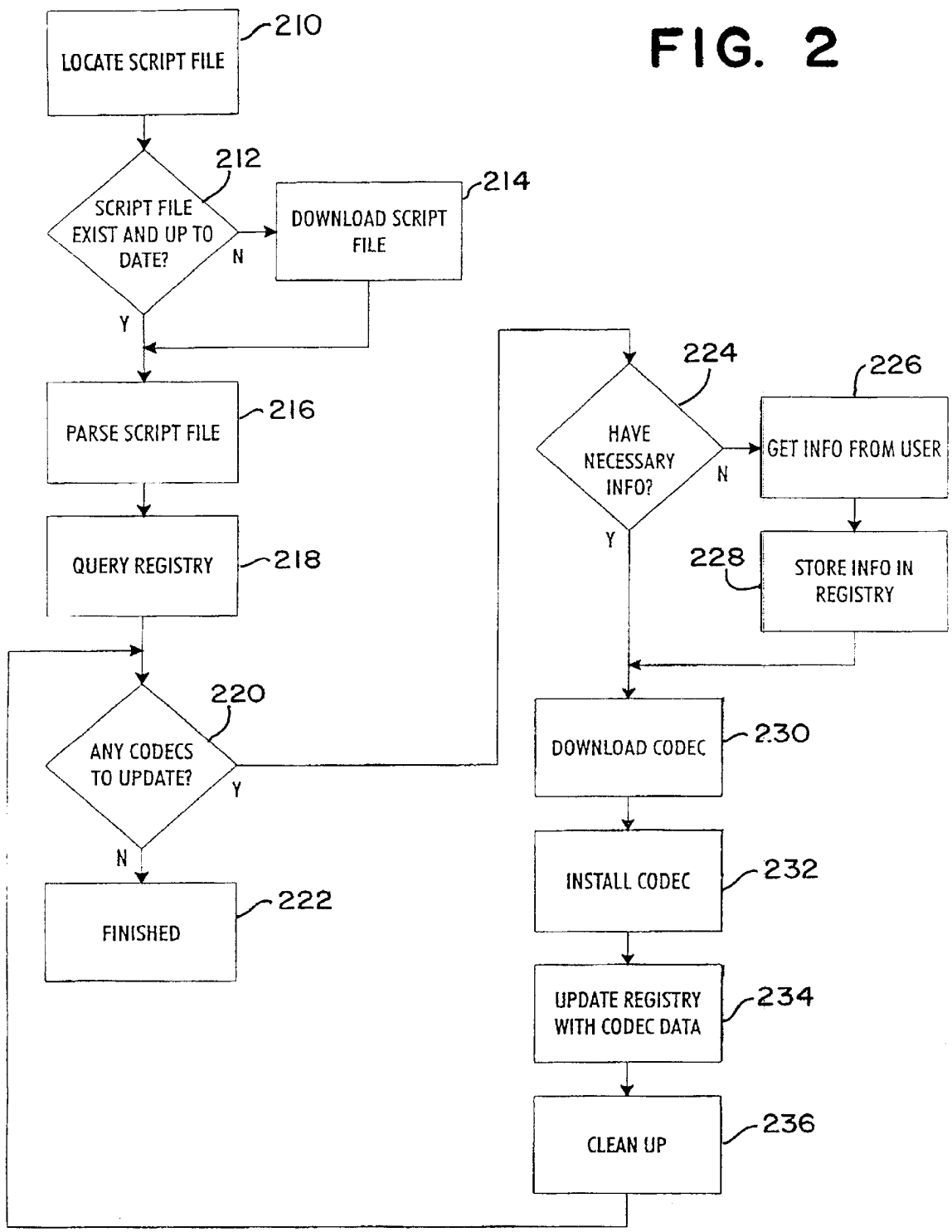
FIG. 2 is a flowchart illustrating the functions performed by the software component updating system of FIG. 1.

The process will now be described in greater detail with reference to FIG. 2. When a user wishes to update the codecs installed at the user terminal 112, the multimedia software component updating program is invoked, which performs the sequence of steps set forth. First, a search is undertaken to locate a script file locally at the user terminal (step 210), without downloading a copy from the update service provider 114. If a local script file exists and an expiration date set forth in the script file has not yet passed (step 212), then the local script file is reused. Otherwise, a new copy of the script file is downloaded from the update service provider (step 214).

After a new script file has been downloaded or it has been determined that an old script file has not expired, the script file is parsed (step 216) and analyzed to determine which codecs described in the script file are usable on the user terminal 112. The user terminals system registry is then queried (step 218) to identify which codecs are already installed on the user terminal 112, as well as the version number for each installed codec. The registry is a system configuration file maintained in Microsoft Windows 95 and Windows NT; application programs can post and retrieve registry information to determine or alter system and software configuration data. The codec information in the script file (specifically the codec names, version numbers, and compatibility information) is compared against the codec information stored in the registry. On the basis of this comparison, a list of newly available and uninstalled codecs is formulated.

It should be noted that the locally stored codec information need not be placed in the Windows system registry, though that approach is standard and presently preferred. Alternatively, a separate configuration file can be maintained by the multimedia software component update system to store the same information. Moreover, the registry and configuration file information queried need not be created by the multimedia software component update system itself (if run a prior time). When codecs (and other software components) are installed, even manually, they frequently update the registry or create their own configuration files, at least to provide information to the browser that the codec is available. When the update system is run for the first time, these additional resources are queried by the invention to determine what codecs have been installed without the inventions assistance.

At this time, the registry is also queried to determine what network browser is being used. Codecs are frequently available in several different forms. A stand-alone "helper" application is not integrated with any particular browser, and hence can be used on nearly any user terminal 112. A codec in the form of a Microsoft ActiveX control is usable with Microsoft Internet Explorer and with the most recent versions of Netscape Navigator. A codec in the form of a "plug-in" is typically used with current and older versions of Netscape Navigator. Accordingly, under certain system configurations, a user might wish to install only certain kinds of codecs, for example plug-ins. By querying the system registry and determining that Netscape Navigator is installed and Microsoft Internet Explorer is not, for example, that determination can be made automatically.

The user is given the option to install all identified codecs or to select a subset to install. In either case, if there are no new codecs to install, then the multimedia software component update system is finished (step 222). Otherwise, the system registry is checked once again (step 224) to determine whether sufficient user information is available to download the requested codecs.

As discussed above, codecs typically are available from codec providers 116 and 118, who frequently make the codecs available to download free of charge. These codec providers make their money in other ways, for example by licensing the software used to create the compressed video clips in the format supported by their codec. However, when a user wishes to download a codec, he is often faced with the need to fill out various on-line forms with his name, e-mail address, postal address, telephone number, and other information for the codec provider's records. He may also be asked to consent to a software license agreement before the download is permitted. These factors make the automation of the download process difficult.

However, as noted above, the script file of the invention contains specific download instructions for each codec. As an example, for a given codec, a first codec provider 116 might request the user's name and e-mail address before a download is permitted. Accordingly, the invention maintains records of the user's vital information, including his name, e-mail address, postal address, and other data for use when necessary to download a codec. The information necessary for a particular download operation can be determined by analyzing the script file for all of the codecs to be downloaded. If some of the required information has not already been acquired from the user, or if the invention is being run for the first time, then a form is presented to the user, and the user information is entered (step 226). The user information is then stored in the system registry (step 228), so that it will not need to be re-entered by the user when the updating system is run again and additional codecs are requested.

Figure 3:
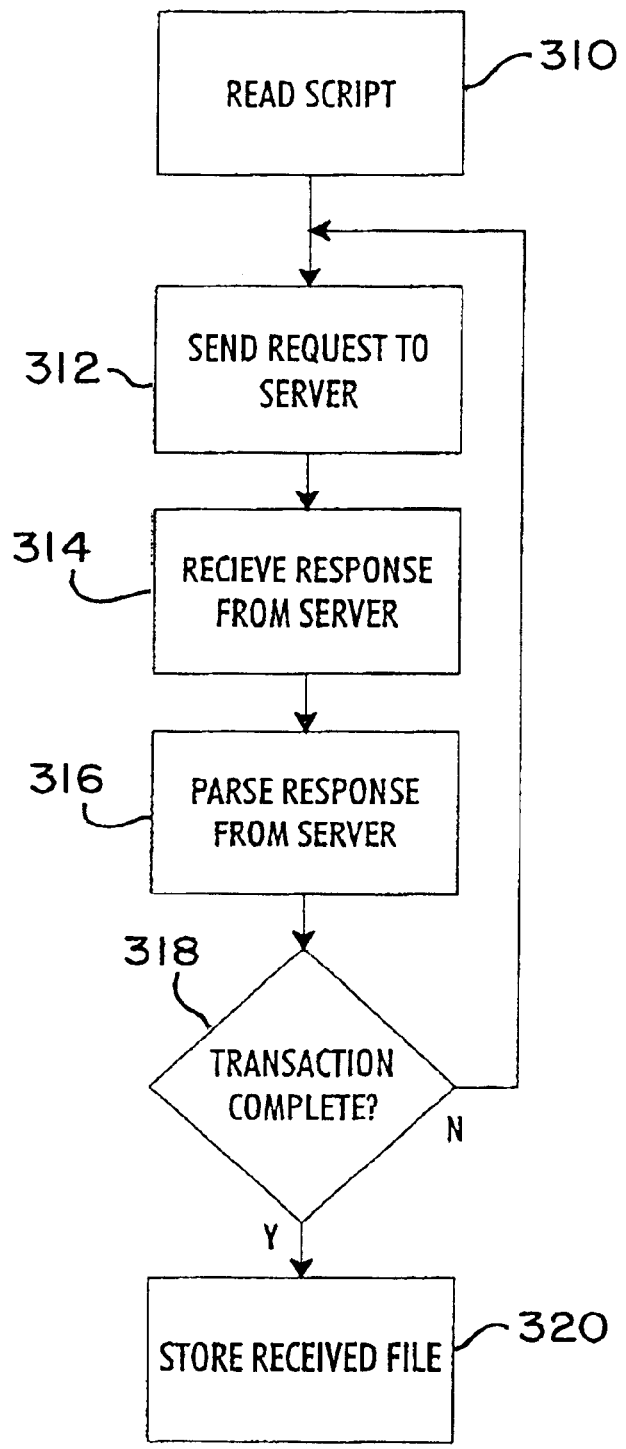
FIG. 3 is a flowchart illustrating the functions performed in the downloading step set forth in the flowchart of FIG. 2.

A codec is then downloaded (step 230) by providing the codec provider 116 with the information it would have expected had the user performed this step manually. For example, if a user would have entered information into a sequence of forms, then the updating system simulates the responses the codec provider would have received upon a user filling out the forms manually. This process is discussed in greater detail below, in conjunction with the flowchart of FIG. 3. This download operation can include several exchanges of information between the user terminal 112 and the codec provider 116 before the codec file is actually downloaded.

After the codec is downloaded, it is installed (step 232) according to instructions set forth in the corresponding portion of the script file. Some codecs are provided in the form of a self-extracting archive that need only be invoked. After it is started, the codecs own installation program will take over, prompting the user for additional information as necessary. Other codecs are provided in archive file form; these archive files must be decompressed into temporary storage before the installation program can be invoked. In a preferred embodiment, the multimedia software component updating system can deal with either type of codec, as well as others presently unanticipated. Some codecs can be installed only while the browser is not running. In such cases (specified in the script file), the browser is closed and installation is allowed to proceed. Upon completion of the installation process, the browser is re-opened and caused to re-load the Web page that was previously being viewed.

After the codec is successfully installed, the system registry is updated with information on the name, version, and type (e.g., ActiveX control or plug-in) of the installed codec (step 234). This information will be used when the updating system is run again, to determine the status of the codecs installed on the system. Then any necessary clean-up is performed (step 236). This can include deleting temporary files created during the installation of a codec, and deleting the downloaded archives themselves, if desired (or, optionally, moving them to a backup location for long-term storage).

The acquisition and installation of one new codec is then complete. If there are any additional codecs indicated for installation (step 220), the process then repeats. However, on successive downloads, all necessary user information will already have been collected, so the user need not be queried again.

As discussed above, the download process can be rather cumbersome; it is dictated by the design of the Internet site through which the software can be acquired. However, in nearly all cases, the process can be described as a "conversation" between the user terminal 112 and the codec provider 116; as is set forth in detail in FIG. 3. Because the script file is downloadable and changeable by the update service provider, the updating tool is easily "upgraded" to accommodate newly released codecs, changes in the processes used to download existing codecs, and multiple geographically-distributed mirror sites from which to download the codec files.

At the outset of the download process, the script file is read to identify the instructions, or script, that corresponds to the codec that is to be downloaded (step 310). The script contains a sequence of requests and responses intended to simulate the entry of data into forms via a browser.

A first request is read from the script and sent to the server identified in the script file (step 312). As discussed above, this request can be made via the "GET method" or the "POST method," whichever is required by the server being accessed. A response is then received from the server (step 314). The response is then parsed (step 316). It may indicate that the request was successfully processed, and that the script can move on to the next step. Or the response may indicate that there is an error condition, requiring either retransmission of the same request to the server (at step 312) or the need to abort the download process. Alternatively, the request may result in the transmission of the codec file. If the download process is aborted or completed, then the transaction is complete (step 318), and the received file, if any, is stored at the user terminal 112 (step 320).

While the foregoing description and accompanying flowchart illustrate the general process by which a server at a codec provider's Internet site is prompted to send a codec file, some specific examples should be illustrative. Accordingly, five different scenarios will be set forth below, each of which shows a possible sequence of requests and responses between the user terminal 112 and the codec provider 116.

In the first and simplest scenario, the script specifies a single GET request that simply specifies the filename of the requested codec file. For example, the request "GET/products/mycodec.exe HTTP/1.0" might be sent to the server www.codecprovider.com. The "/products/mycodec.exe" portion of the GET request identifies the desired codec file. The "HTTP/1.0" at the end of the request identifies the version of the HTTP protocol under which the request is being made; it is part of all HTTP requests. Following this line of the GET request are additional lines of information transmitted by the browser specifying, among other things, what kinds of data are accepted by the browser. These additional lines are omitted here, as they are system-dependent and would be known and understood by an individual of ordinary skill in the art.

In an alternative version of the first scenario, the script specifies a single GET request that identifies the desired codec and includes some information about the user, for example his e-mail address. This type of request might look like "GET/cgi-bin/products/download/dl.cgi? product=MyCodec&email=jdoe@user.net HTTP/1.0". The "/cgi-bin/products/download/dl.cgi" portion of the request identifies a program running on the server that is able to parse the remainder of the request. The "product=MyCodec" portion identifies the requested file, and "email=jdoe@user.net" is the user information needed by the codec provider in order to fulfill the request. The question marks and ampersands are simply used as delimiters to identify where the various fields of the request begin and end.

In the first scenario, under either GET request alternative, the codec provider 116 responds by sending the desired file. In the first scenario, the download process is completed after a single request and a single response, and it does not iterate.

In a second scenario, a first GET request identifies the desired codec and includes certain information about the user. This request might also look like "GET/cgi-bin/products/download/dl.cgi?product=MyCodec&email=jdoe@user.net HTTP/1.0". However, in the second scenario, the server responds not by sending the requested codec file, but by sending an HTML file that provides a number of links to download sites, for example several mirror sites in different geographic locations. This response is parsed, a link is selected from the HTML file, and a second GET request is then sent to a particular server. For example, the request "GET/products/mycodec.exe HTTP/1.0" might be sent to www.usa.codecprovider.com or to www.europe.codecprovider.com, depending on the options in the HTML file and the user's location (as specified in the user information stored in the system registry). The script for the codec provider 116 is programmed to expect the HTML file received after the first GET request; the multimedia software component updating system is programmed to be able to parse the HTML file, determine the options, and formulate the appropriate second GET request. In the second scenario, two separate GET requests and two separate responses are generated; the second response is the requested codec file. A scheme similar to this is presently used by RealNetwork for access to its RealPlayer codec software.

In a third scenario, three separate GET requests are used. A first GET request sends some basic user information; a first HTML file is received in response. A second GET request is generated based on the contents of the first HTML file and further user information; a second HTML file is received in response. A third GET request is generated based on the contents of the second HTML file; the codec file is received in response. A scheme similar to this is used by VXtreme for its Web Theater codec package.

In a fourth scenario, a POST request is first used to send user information to the server. For example, the request "POST/products/dl.cgi HTTP/1.0", followed by a quantity of user information, is first sent to the server. The server processes the user information and responds by sending an HTML file. A GET request based on that HTML file is then sent, which results in the codes file being sent. A variation of this approach is presently used to access Macromedia's Shockwave codec software.

In a fifth scenario, the FTP ("File Transfer Protocol") Internet protocol is used rather than HTTP. The FTP protocol requires a more elaborate sequence of communication than does HTTP. One sample transaction is as follows. The user terminal 112 first sends the command "USER anonymous" to request an anonymous FTP transaction; the server responds by indicating success or failure. The command "PASS jdoe@user.com" is then sent (in anonymous FTP transactions, the user's e-mail address is usually requested as the password); the server responds with success or failure. Further command/response pairs are used to determine the server's operating system type (which can be used to compensate for file format differences), set a passive connection type (in which the user terminal will initiate data connections), set a binary transfer mode (as opposed to text files), determine the size of the file to be downloaded, and finally to retrieve the file. This type of transaction is used by Apple for its QuickTime video codec.

The preceding five scenarios are set forth as illustrative examples only; many additional possibilities also exist. For example, a server might send a software license agreement as an HTML file, requesting the user to indicate whether he accepts the agreement. This information would be passed along by the invention to the user, as it would not be proper to assume and automate the acceptance of a license agreement. Moreover, different sequences of GET and POST requests may be necessary for a particular codec provider. However, in any of these cases, the script file can be set up to accommodate the particular sequence of requests expected by a codec provider. Moreover, if a codec provider changes its procedure for accessing its codec software, new script files can be provided by the update service provider 114. For this reason, as discussed above, script files are provided with expiration dates. If a script file has expired, the user terminal 112 will retrieve a new version before updating is permitted.

The foregoing detailed description addresses the issue of identifying, acquiring, and installing multimedia codecs for use in browsing the Internet. However, it should be noted that nothing in the disclosed system or method necessarily limits the invention to that application. The invention can be used to update and maintain any number of software programs or components, in individual or widely disparate fields of use. For example, it is appreciated that the invention could easily be adapted to identify, acquire, and install various other computer programs, such as system utilities, operating system updates, games, or other programs or components that a particular user might be interested in. The invention could easily be modified to accomplish these additional objectives, without undue experimentation, by a person of ordinary skill in the art.

While certain exemplary structures and operations have been described, the invention is not so limited, and its scope is to be determined according to the claims set forth below.

What is claimed is:

1. A method for updating software components on a user terminal connected to a network comprising the steps of:
   analyzing a script file having an expiration date to ascertain what software components are available based on information in the script file and information provided by the user;
   querying stored configuration information on the user terminal;
   determining what software components need to be updated;
   simulating a manual transaction between the user terminal and a server to provide user information to the server; and
   transferring at least one software component from the server to the user terminal.

2. The method of claim 1, wherein the stored configuration information comprises a system registry.

3. The method of claim 1, wherein the determining step comprises the substeps of:
   identifying at least one software component having a current version number described in the script file;
   ascertaining whether the software component is installed on the user terminal, and if so, what version number of the software component is installed; and
   generating a list of software components that are either not installed on the user terminal or have an installed version number lower than the current version number.

4. The method of claim 1, wherein the simulating step comprises the substeps of:
   transmitting a request from the user terminal to the server; and
   receiving a response from the server.

5. The method of claim 4, wherein the request comprises an HTTP request formulated from script information in the script file or user information received from a user.

6. The method of claim 5, wherein the HTTP request further comprises link information taken from a prior response from the server.

7. The method of claim 4, wherein the request comprises an FTP command formulated from script information in the script file or user information received from a user.

8. The method of claim 4, wherein the simulating step further comprises the substep of repeating the transmitting and receiving steps until the server is ready to transmit the software component.

9. The method of claim 4, wherein the simulating step further comprises the substeps of:
   parsing the script file to determine what user information will be required by the server; and
   checking whether the required user information is in the stored configuration information, and if not, prompting a user to enter the required user information and storing the required user information in the configuration information.

10. The method of claim 1, further comprising the steps of:
    installing the software component; and
    updating the stored configuration information with the name and a version number for the software component.

11. The method of claim 1, wherein the software components are multimedia codecs capable of decompressing digital video.

12. The method of claim 1, further comprising the step of acquiring an original script file from an update service provider.

13. The method of claim 12, further comprising the step of acquiring a new script file if the expiration date on the original script file has passed.

14. The method of claim 1, wherein the information provided by the user is at least one of a user name, a user e-mail address and a user postal address.

15. The method of claim 1, wherein the information in the script file is multimedia codec information.

16. The method of claim 15, wherein the multimedia codec information includes at least one of most recent version numbers of the software components, specific capabilities of each codec, network locations from which the codecs can be obtained, browser compatibility information and instructions on how to automatically acquire and install each codec.

17. A method for identifying and downloading software components on a user terminal connected to a network comprising the steps of:
    analyzing a script file to ascertain what software components are available based on information in the script file and information provided by the user;
    querying stored configuration information on the user terminal;
    determining whether a user desires to download any of the available software components;
    simulating a manual transaction between the user terminal and a server to provide user information to the server; and
    transferring at least one software component from the server to the user terminal,
    wherein the information provided by the user is at least one of a user name, a user e-mail address and a user postal address.

18. The method of claim 17, wherein the simulating step comprises the substeps of:
   transmitting a request from the user terminal to the server; and
   receiving a response from the server.

19. The method of claim 18, wherein the request comprises an HTTP request formulated from script information in the script file or user information received from a user.

20. The method of claim 19, wherein the HTTP request further comprises link information taken from a prior response from the server.

21. The method of claim 18, wherein the simulating step further comprises the substeps of:
   parsing the script file to determine what user information will be required by the server; and
   checking whether the required user information is in the stored configuration information, and if not, prompting a user to enter the required user information and storing the required user information in the configuration information.

22. The method of claim 17, further comprising the steps of:
   installing the software component; and
   updating the stored configuration information with a name and a version number for the software component.

23. The method of claim 17, wherein the information in the script file is multimedia codec information.

24. The method of claim 23, wherein the multimedia codec information includes at least one of most recent version numbers of the software components, specific capabilities of each codec, network locations from which the codes can be obtained, browser compatibility information and instructions on how to automatically acquire and install each codec.

* * * * *